United States Patent [19]

Itai

[11] Patent Number: 5,148,441

[45] Date of Patent: Sep. 15, 1992

[54] SOLID STATE LASER

[75] Inventor: Masanori Itai, Tokyo, Japan

[73] Assignee: Kabushiki Kaisha Topcon, Japan

[21] Appl. No.: 705,582

[22] Filed: May 24, 1991

[30] Foreign Application Priority Data

May 25, 1990 [JP] Japan ................................. 2-134120
May 28, 1990 [JP] Japan ................................. 2-135388

[51] Int. Cl.$^5$ ..................... H01S 3/091; H01S 3/092
[52] U.S. Cl. .................................................. 372/70
[58] Field of Search ............................ 372/70, 71, 72

[56] References Cited

U.S. PATENT DOCUMENTS

| 4,785,459 | 11/1988 | Baer | 372/70 |
| 4,876,694 | 10/1989 | Hughes | 372/70 |
| 4,908,832 | 3/1990 | Baer | 372/70 |

Primary Examiner—John D. Lee
Assistant Examiner—Robert E. Wise
Attorney, Agent, or Firm—Ronald P. Kananen

[57] ABSTRACT

A solid state laser comprising: (a) at least a laser generating means (40, 41, 42, 43, 44, 45) for generating a pumping laser light (L2); (b) a plurality of laser medium means (21, 105, 106) arranged relative to the laser generating means (40, 41, 42, 43, 44, 45); (c) the laser medium means (21, 105, 106) arranged for defining a zigzag reflected optical path (LD) when imparting the laser light (L2) or the laser lights (L2) to the laser medium means (21, 105, 106) along the zigzag reflected optical path (LP); and (d) an optical means (60, 61) for performing oscillating and exciting operations of a laser light (L1) produced along the zigzag reflected optical path (LP) when imparting the laser light (L2) or the laser lights (L2) to the laser medium means (21, 105, 10) along the zigzag reflected optical path (LP), thereby producing a high power output light (L3).

16 Claims, 11 Drawing Sheets

SOLID STATE LASER

BACKGROUND OF THE INVENTION

This invention relates generally to a solid state laser, and more particularly relates to a solid state laser resonator.

The advantage of a conventional solid state laser excited by imparting a laser light to an end face or end faces thereof is that it easily obtains the $TEM_{oo}$ mode as compared with a conventional solid state laser excited by imparting a pumping light to a side or sides thereof. However, in operation, it is difficult for the former to impart a laser light for producing a high-power output laser light.

A tandem solid state laser resonator excited by laser lights 1, 2 in a multistage manner as shown in FIG. 10 and a solid state laser resonator as shown in FIG. 11 excited by imparting laser lights to multiside thereof are developed to obtain a high-power output laser light having the advantage of the former.

The solid state laser resonator of FIG. 10 is designed to impart the laser lights 1,2, generated from laser generators to laser rods 3,4, respectively, and to be resonated by mirrors 5,6 and an output mirror 7 so as to obtain an output laser light 8.

The solid state laser resonator of FIG. 11 is designed to impart the laser lights through optical fibers 12 to a Nd: YAG (Yttrium-aluminium-garnet) crystal. In FIG. 11, reference numeral 13 indicates an output mirror and a reference numeral 14 indicates a semiconductor laser.

Since the optical system of the solid state laser resonator of FIG. 10 requires many components including the mirrors 5,6 and 7, the optical system is large to arrange the components in their necessary position. Also, in FIG. 10, since the mirrors 5,6 are arranged between the end faces of the rods 3,4 for imparting the laser lights thereto, the distance from each of the laser generators to the end face of the rod is great for focusing (to pump). Thus it is impossible to inexpensively design the optical system for the laser resonator.

The optical system of the solid state laser resonator of FIG. 11 is provided to solve the above-mentioned problems of the optical system of FIG. 10. However, although the optical system of FIG. 11 requires a large homogeneous Nd: YAG crystal 11, which is difficult to make or obtain the large homogeneous Nd: YAG crystal 11 and thus the production or acquisition cost thereof is high.

Furthermore, in the case of a solid state laser pumped by imparting a laser light or laser lights from a semiconductor laser or semiconductor lasers to an end face or end faces thereof, as the laser beam diameter of the laser light is very small compared with the size of a crystal, the crystal is utilized for imparting the laser light thereto in a very inefficient manner.

In a further conventional solid state laser, a slab crystal is excited to produce an output laser power in a highly efficient manner. However, the slab crystal which is formed in a rectangular plate has an effective oscillation volume greater than that of a rod-shaped crystal.

Recently, to provide a semiconductor laser which can generate a high-power laser output light, the solid state laser of FIG. 11 is used for the high-power semiconductor laser or laser as a pumping source.

However, in the conventional solid state laser including the slab crystal or the solid state laser of FIG. 11, an optical path runs zigzag in the laser base material such as the Nd: YAG crystal 11. In the conventional solid state laser of FIG. 11, light from the semiconductor laser 14, for pumping a laser light along a zigzag optical path, is imparted along a direction different than the zigzag optical path.

Also, for example, the zigzag optical path has at least two different directions in the laser base material arranged in such a manner that one of the two different directions coincides with the crystal orientation for generating the laser light while the other of the two different directions does not coincide with the crystal orientation. Thus, the other of the two different directions has no relation to the laser oscillating operation. A characteristic, such as a polarization characteristic, almost prevents the laser oscillating operation.

SUMMARY OF THE INVENTION

The object of the present invention is to provide a solid state laser useful for, for example, a photocoagulator or a laser light machine which can easily produce a high-power output laser light in a highly efficient manner and be compact in size.

Another object of the present invention is to provide a solid state laser in which a zigzag optical path of a laser light or laser lights from a laser generator or laser generators coincides with a crystal orientation of a laser medium or laser mediums for laser oscillating operation.

Accordingly, a solid state laser according to the present invention comprises: at least a laser generating means for generating a laser light; a plurality of laser medium means arranged relative to the laser generating means; the laser medium means arranged for defining a zigzag reflected optical path when imparting the laser light or the laser lights to the laser medium means along the zigzag reflected optical path; and an optical means for performing oscillating and exciting operations of a laser light produced along the zigzag reflected optical path when imparting the laser light or the laser lights to the laser medium means along the zigzag reflected optical path, thereby producing a high power output light.

Also, a solid state laser according to the present invention comprises: at least a laser generating means for generating a laser light; a laser medium means arranged relative to the laser generating means; a support means for supporting the laser medium means, and defining a zigzag reflected optical path, together with the laser medium means when imparting the laser light or the laser lights to the laser medium means; and an optical means for performing oscillating and exciting operations of a laser light produced along the zigzag reflected optical path when imparting the laser light or the laser lights to the laser medium means, thereby producing a high power output light.

Furthermore, a solid state laser according to the present invention comprises: a laser generating means for generating a laser light; first and second members arranged corresponding to the laser generating means; a laser medium means arranged between the first and second members for defining a zigzag reflected optical path together with the first and second mirrors when imparting the laser light or the laser lights through the mirrors to the laser medium means along the zigzag reflected optical path; and an optical means for performing oscillating and exciting operations of a laser light produced along the zigzag reflected optical path when imparting the laser light or the laser lights through at least one of the first and second members to the laser medium means, thereby producing a high power output laser light.

DETAILED DESCRIPTION OF THE INVENTION

FIRST EMBODIMENT

Figure 1:
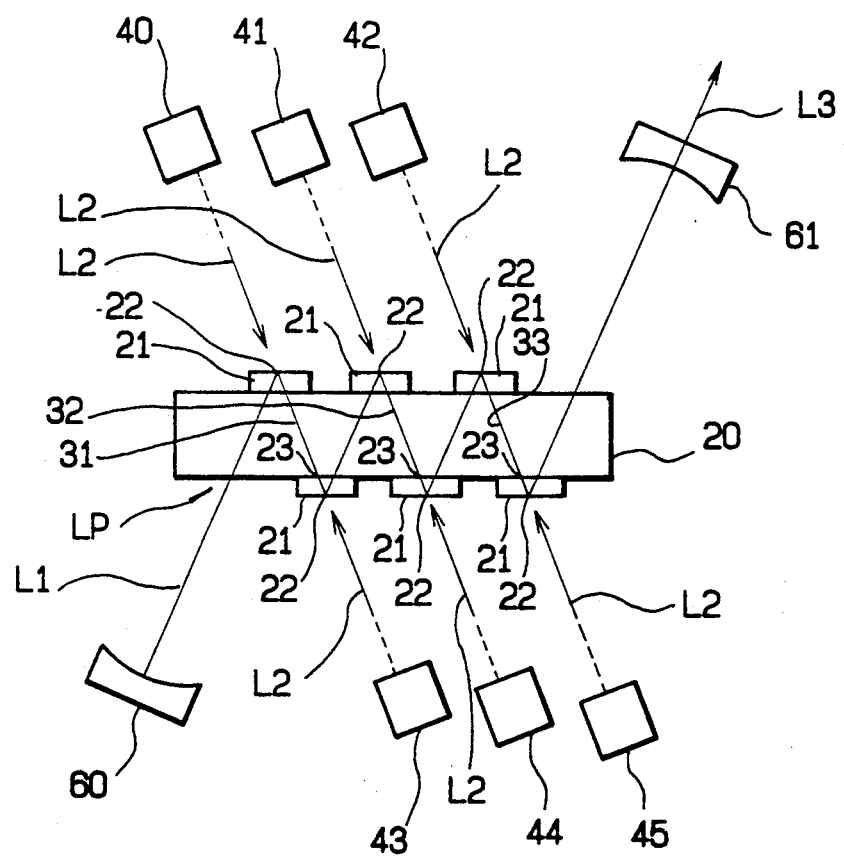
FIG. 1 shows a first embodiment of a solid state laser according to this invention.

Referring to FIG. 1, an intermediate laser medium 20 may be made of a material capable of transmitting a laser light, such as a crown glass or flint glass. For example, the intermediate laser medium 20 is formed in a rectangular shape. The intermediate laser medium 20 has an isotropic characteristic to reduce absorption loss and scattering loss of a laser light L1 or a laser light L2 for pumping.

A plurality of laser medium pellets 21 are provided on one side of the intermediate laser medium 20 and the other side of the intermediate laser medium 20, respectively. The one side of the intermediate laser medium 20 is parallel to the other side of the intermediate laser medium 20. Each of the laser medium pellets 21 has a clear aperture which is designed to neglect an extra thermal absorption length and diffraction loss thereof for obtaining a gain for performing oscillation of the laser light L1.

The laser medium pellets or laser active medium pellets 21 are arranged to correspond to a zigzag reflected light path LP. The laser medium pellets 21 are formed in a plate-shape and made of Nd: YAG, or YLF (YLi F4) for use in an active mirror. The side 22 of the laser medium pellets 21 is provided with a coating which reflects the laser light L1 in a highly efficient manner and also transmits the light L2 for pumping with a high transmittance. The zigzag reflected optical path LP is defined by the sides 22 of the laser medium pellets 21. The side 23 of each of the laser medium pellets 21 is provided with a nonreflective coating between the intermediate laser medium 20 and the laser medium pellet 21.

A high-reflection mirror 60 is made of, for example, an optical glass. The high-reflection mirror 60 is provided with a coating so as to reflect a laser output light in a highly efficient manner. An output mirror 61 is, for example, a semitransparent mirror which has no absorption and no scattering of the laser output power. Thus, the output mirror 61 is provided with a reflecting layer having a semitransparent characteristic therein. The high reflecting mirror 60 corresponds to one side of the intermediate laser medium 20 while the output mirror 61 corresponds to the other side of the intermediate laser medium 20.

The laser lights L2 for pumping generated from semiconductor lasers 40 and 43 are superimposed through the two laser medium pellets 21 and the intermediate medium 20 along an optical axis of a reflected optical path portion 31. The laser lights L2 generated from semiconductor lasers 41, 44 are superimposed through the two laser medium pellets 21 and the intermediate medium 20 along an optical axis of a reflected optical path portion 32. Also, the laser lights L2 generated from semiconductor lasers 42, 45 are superimposed through the two laser medium pellets 21 and the intermediate medium 20 along an optical axis of a reflected optical path portion 33. The wave length of the laser lights L2 is tuned in an absorption wave length range of the laser medium 20. The laser light L2 are generated from a laser generator such as a laser diode (LD) or a dye laser. The wave length of a laser output light L3 is 1.06 micrometers in the case of the laser medium pellet 21 of the Nd: YAG. The wave length of the laser output light L3 is 1.053 micrometers in the case of the laser medium pellet 21 of YLF.

The laser lights L2 are superimposed by the operation of the semiconductor lasers 40, 41, 42, 43, 44 and 45.

The laser lights L2 are imparted to the laser medium pellets 21 at a desired angle of incidence in such a manner that the optical axis of the laser light L2 coincides with both the direction of a reflected light flux and the direction of a refraction light flux in the intermediate medium 20. For example, the incident angle of the laser light L2 is defined on the basis of the optical axis of the laser light L1, the wave length of the laser light L2, and the index of refraction of the laser active material under Snell's law. Thus, the laser light L1 travels along the zigzag optical path LP between the output mirror 61 and the high reflecting mirror 60 and then excited and resonated by the plurality of the laser light L2 in a multistage excitation manner. Thus the output of the laser light L1 is increased to generate the high output laser light L3.

SECOND EMBODIMENT

Figure 2:
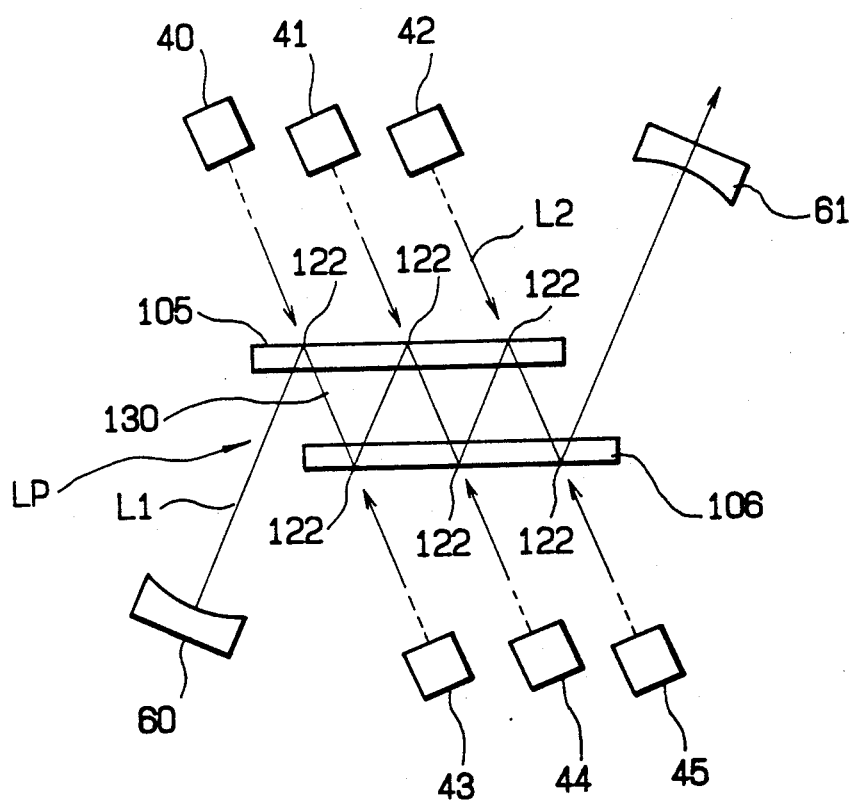
FIG. 2 shows a second embodiment of a solid state laser according to this invention.

Referring to FIG. 2, and a second embodiment, two laser medium members 105, 106 formed in a plate mirror are arranged as shown. The side 122 of each of the laser medium members 105, 106 is provided with a coating which reflects a laser light L1 in a highly efficient manner and transmits a laser light L2 in a high transmittance. The laser medium members 105, 106 are employed as laser base material members. An air layer 130 is employed as an intermediate medium between the laser medium members 105, 106. The laser medium members 105, 106 are made of a material such as the Nd: YAG. Because the difference between the refraction index of the air layer 130 and the refraction index of the laser medium members 105, 106 is great, a nonreflection coating is required. If an intermediate laser medium made of material such as glass (LaSF06) is used in place of the air layer for supporting the laser medium members 105 106, the reflecting loss and scattering loss in the boundary face between the laser medium members 105, 106 and the intermediate laser medium can be reduced because the difference between the refraction index of the intermediate laser medium and the refraction index of the laser medium members 105, 106 is small.

As mentioned above, one of the laser medium member 105 is spaced from the other of the laser medium member 106. Also the intermediate layer formed between them is an inactive layer. Therefore, it is possible to save the laser base material which does not serve to obtain the output gain of the output laser light. Also it is possible to reduce loss by reabsorption and heat deformation during absorption to prevent the natural intervention in the heat deformation.

THIRD EMBODIMENT

Figure 3:
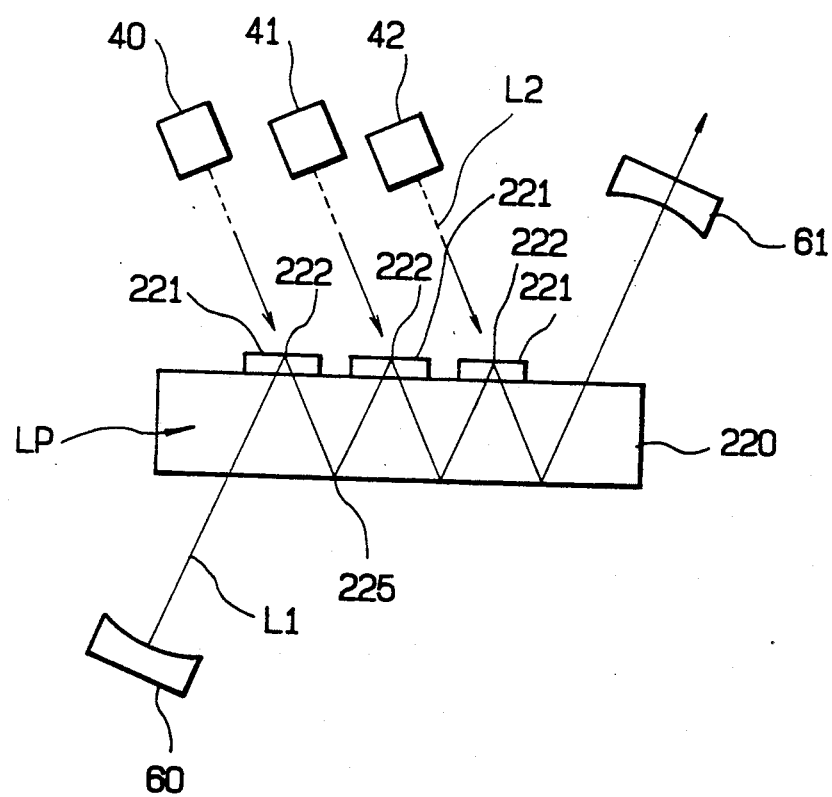
FIG. 3 shows a third embodiment of a solid state laser according to this invention.

Referring to FIG. 3, and a third embodiment, laser medium pellets 221 are supported on one side of plate (or support glass) 220 made of glass mirror to employ as a laser active mirror. The sides 222 of the laser medium pellets 221 has a coating which reflect a laser light L1 in a highly efficient manner and also transmits a laser light L2 with a high transmittance. The side 225 of the plate 220 is provide with a coating in such a manner that portions of the side 225, defined for transmitting the laser light L1 can transmit the laser light L1, and the remainder of the side 225, except said portions can reflect the laser light L1 in a highly efficient manner. Semiconductor lasers 40 to 42 are arranged relative to the laser medium pellets 221, as shown.

FOURTH EMBODIMENT

Figure 4:
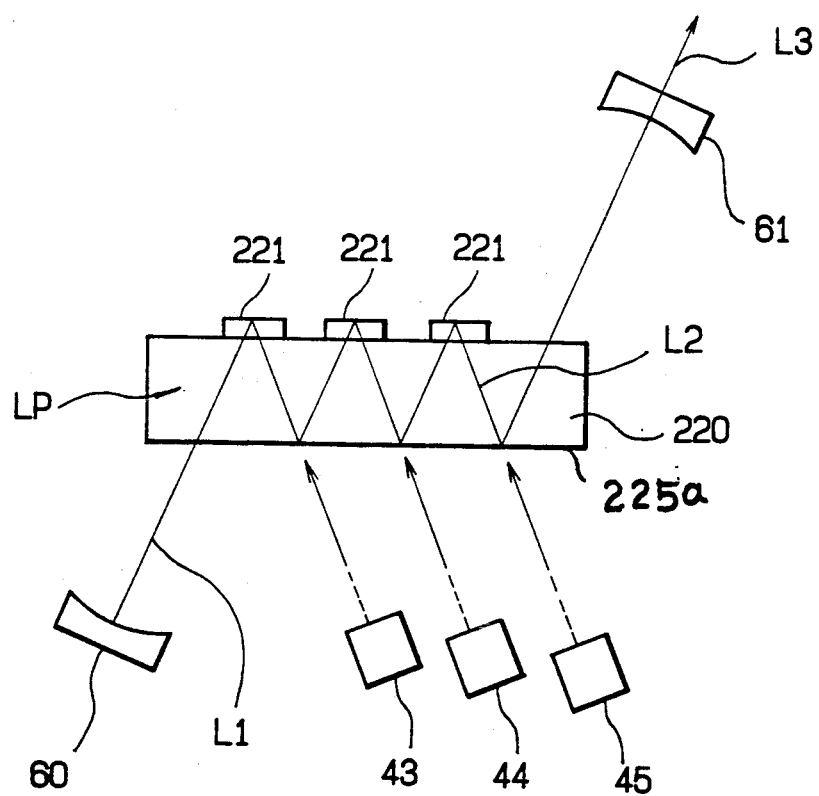
FIG. 4 shows a fourth embodiment of a solid state laser according to this invention.

Referring to FIG. 4, and a fourth embodiment, laser lights L2, generated from semiconductor lasers 43 to 45, are superimposed through a laser medium member or a support glass 220 to each laser medium pellet 221. The side 225a of the support glass 220 is provided with a coating in such a manner that portions of the side 225, defined for transmitting the laser light L1, can transmit the laser light L1 and the remainder of the side 225a ,except said portions, can reflect the laser light L1 in a highly efficient manner and also transmit the laser light L2.

FIFTH EMBODIMENT

Figure 5:
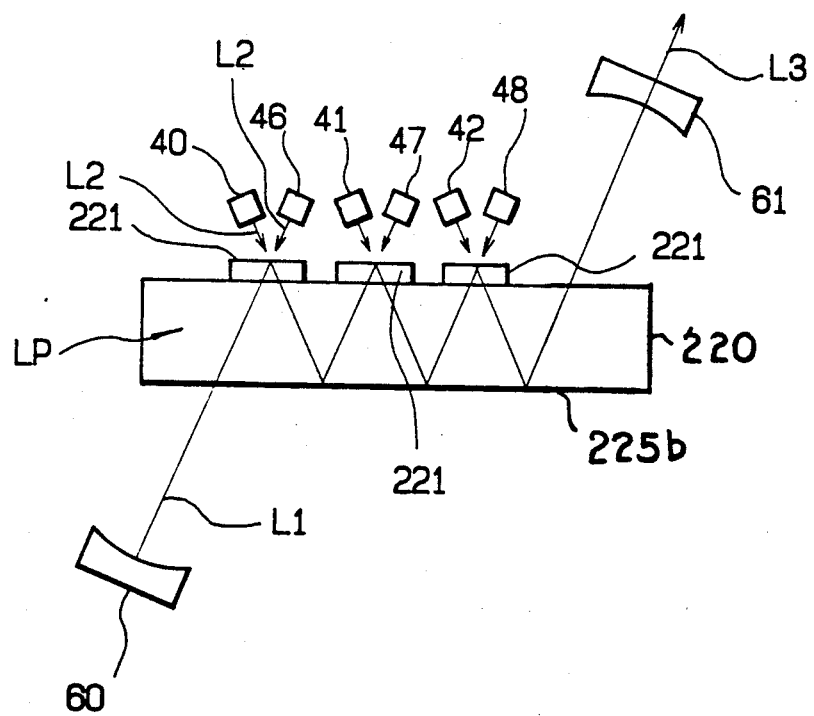
FIG. 5 shows a fifth embodiment of a solid state laser according to this invention.

Referring to FIG. 5, the fifth embodiment is provided with three pairs of semiconductor lasers 40, 46; 41; 47, 42, 48. Thus, it is possible to increase the laser output power L3. A side 225b of a support glass 220 is provided with a coating. Thus, a portion of the side 225b, defined for transmitting the laser light L1, from a high reflecting mirror 60, can transmit the laser light L1. Also, a portion of the side 225b defined for giving the laser light L1 to the output mirror 61 can transmit the laser light L1. The remainder of the side 225b, except said portions, can reflect the laser light L1 in a highly efficient manner.

SIXTH EMBODIMENT

Figure 6:
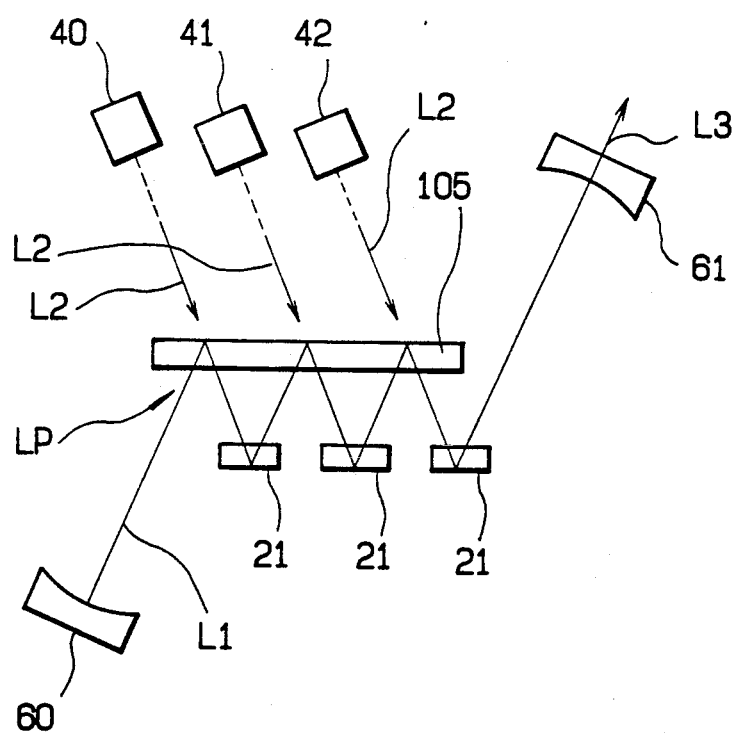
FIG. 6 shows a sixth embodiment of a solid state laser according to this invention.

Referring to FIG. 6, the sixth embodiment comprises laser medium pellets 21 and a laser medium member or mirror plate 105 arranged as shown.

SEVENTH EMBODIMENT

Figure 7:
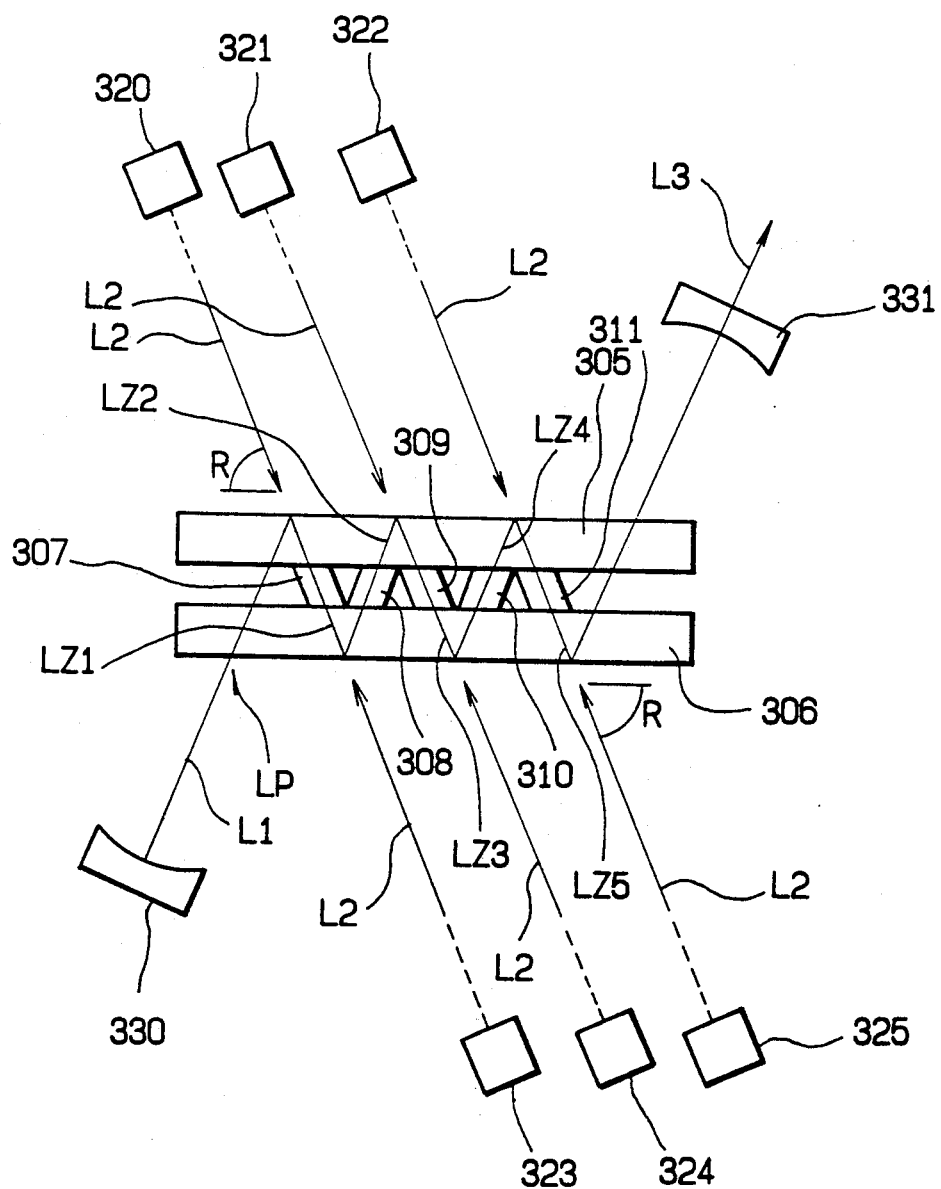
FIG. 7 shows a seventh embodiment of a solid state laser according to this invention.

Referring to FIG. 7, and a seventh embodiment a mirror 305 is parallel to a mirror 306. The mirrors 305, 306 are made of isotropic optical glass and formed in a plate. It is easy to obtain said isotropic optical glass and to machine it. At least a further mirror may be connected to the mirror 305 along its longitudinal direction while an additional mirror may be connected to the mirror 306 along its longitudinal direction to increase their area for imparting the laser light L2.

The mirrors 305, 306 can reflect the laser light L1 on their outsides. The mirrors 305, 306 are provided with coatings in such a manner that portions of the mirrors 305, 306, corresponding to an optical axis relative to a high reflective mirror 330, and an output mirror 331, can transmit the laser light L1. The remainder of the mirrors 305, 306, except said portions, can reflect the laser light L1 in a highly efficient manner. Also, the mirrors 305, 306, with the said coatings, can transmit a light L2 with a high transmittance. The coatings are preferably formed by a dielectric multilayer. The laser light L1, produced and excited by the laser light L2, travels zigzag along a reflected optical path LP.

Laser medium pieces 307 to 311 are made of an uniaxial crystal or a biaxial crystal and formed in a rod. The laser medium pieces 307 to 311 are, for example, YV04, NAB, NYAB. The YV04 is larger than the YAG in an absorption band. The NYAB is used for the realization of the laser active action and SHG action. The NAB is high in conversion efficiency. The upper and lower end faces of the laser medium pieces 307 to 311 are inclined relative to the crystal axis at a desired angle. Each of the laser medium pieces 307-311 has a clear aperture which is designed to neglect an extra thermal absorption length and a diffraction loss thereof for obtaining a gain for performing oscillation of the laser light L1. There is the crystal orientation of each of the laser medium pieces 307-311 during the laser oscillation. Each of the laser medium pieces 307 to 311 is arranged between the mirror 305 and the mirror 306. The laser oscillating orientation in each of the laser medium pieces 307 to 311 coincides with the optical axis of the laser light L1 in its resonated state.

The laser light L1 along the optical axis passes through each of the laser medium pieces 307 to 311. The zigzag optical path LP consists of optical path portions LZ1, LZ2, LZ3, LZ4 and LZ5. The optical path portion LZ1 passes through the laser medium piece 307. The optical path LZ2 passes through the laser medium piece 308. The optical path LZ3 passes through the laser medium piece 309. The optical path LZ4 passes through the laser medium piece 310. The optical path LZ5 passes through the laser medium piece 311. The laser medium pieces 307 to 311 are formed or cut in such a manner that the laser oscillation orientation of each of the laser medium pieces 307 to 311 coincides with the optical axis of the laser light L1, that is, both end faces of each of the laser medium pieces 307 to 311 ar formed with respect to the crystal axis thereof at a desired angle so as to coincide the laser oscillation orientation with the crystal axis thereof. The size of the mirrors 305, 306 or the size of the laser medium pieces 307 to 311 is selected in such a manner that the optical paths portions LZ1, LZ2, LZ3, LZ4 and LZ5 do not interfere to each other.

Each of semiconductor lasers 320 to 325 is used for imparting a pumping laser light L2. The laser light L2 is imparted to the mirrors 305, 306 at a desired angle of incidence R to superimpose the refracted light of the laser light L2 with the laser light L1. The orientation of each laser light L2 from the semiconductor lasers 320 and 323 coincides with the orientation of the optical path portion LZ1 in the solid state laser resonator. The orientation of each laser light L2 from the semiconductor lasers 321 and 324 coincides with the orientation of the optical path portion LZ3 in the solid state laser resonator. The orientation of each laser light L2 from the semiconductor laser 322 and 325 coincides with the orientation of the optical path portion LZ5 in the solid state laser resonator.

The solid state laser resonator is provided with a high-reflecting mirror 330 and an output mirror 331. The high-reflecting mirror 330 is an optical glass with a coating. The coating is, for example, a dieletric multilayer having a high reflection coefficient. The output mirror 331 is, for example, a semitransparent mirror.

The laser lights L2 are generated by the semiconductor lasers 320 to 325. The laser lights L2 are superimposed between the mirrors 305, 306. Therefore, the laser light L1 is resonated between the output mirror 331 and thus the laser light L1 is excited in a multistage pumping manner. Thus the power of the laser light L1 is increased by the laser lights L2 so as to generate the high power output laser light L3. The output power of the laser light L3 is ideally proportional to the number of the laser lights L2. The wave length of the laser light L3 is 1.06 micrometers in the case of Nd: YAG. Also, the wave length of the laser light L3 is 1.053 micrometers in the case of YLF. The laser light L1 is reflected by the mirrors 305, 306 and travels through the laser medium pieces 307 to 311 along the zigzag reflected optical path LP.

EIGHTH EMBODIMENT

Figure 8:
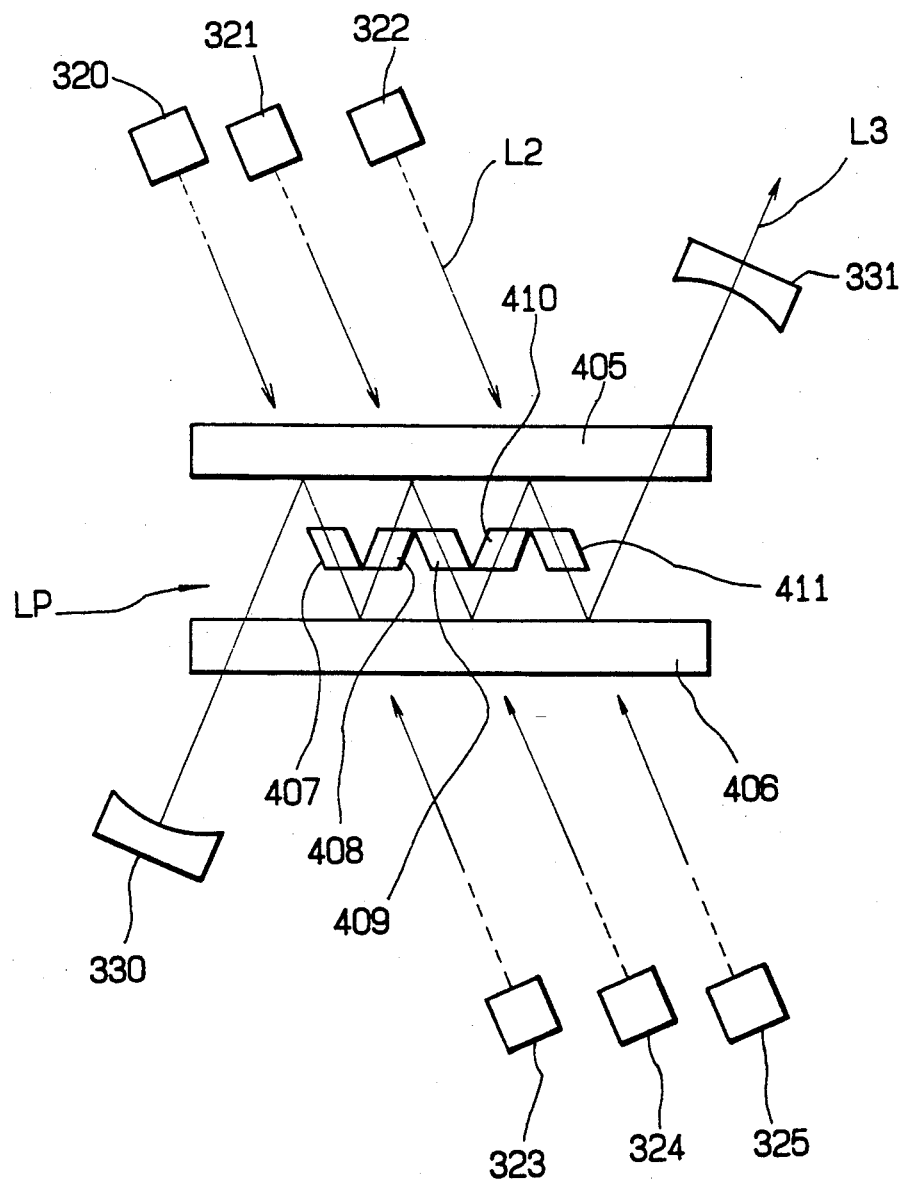
FIG. 8 shows an eighth embodiment of a solid state laser according to this invention.

Referring to FIG. 8, and an eight embodiment mirrors 405, 406 can reflect a laser light L1 on their insides. Thus, although the mirrors 405, 406 are spaced or separated from laser medium pieces 407-411, the exciting operation of the laser light L1 in the eighth embodiment can be performed in the same manner as the exciting operation of the laser light L1 in the seventh embodiment. In this case, each of the laser medium pieces 407-411 is supported by a support means not shown in FIG. 8.

NINTH EMBODIMENT

Figure 9:
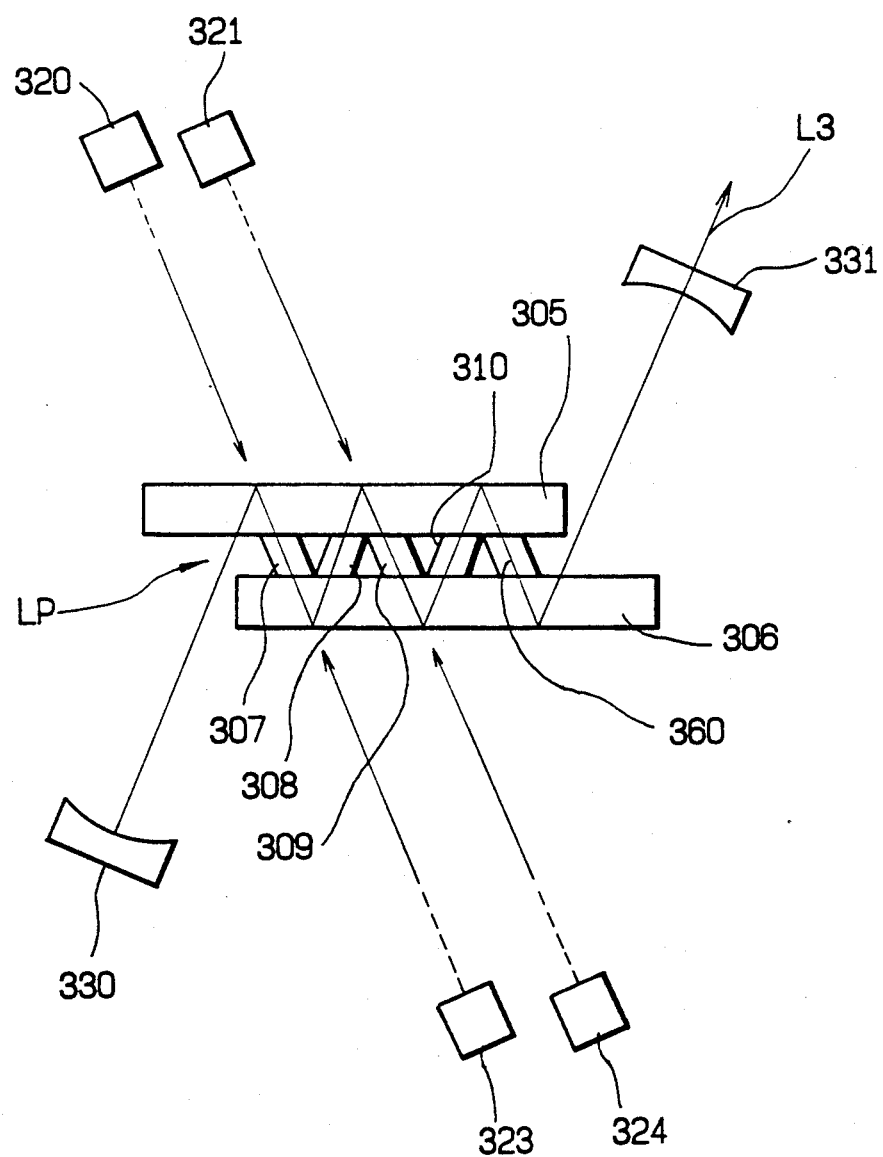
FIG. 9 shows a ninth embodiment of a solid state laser according to this invention.
Figure 10:
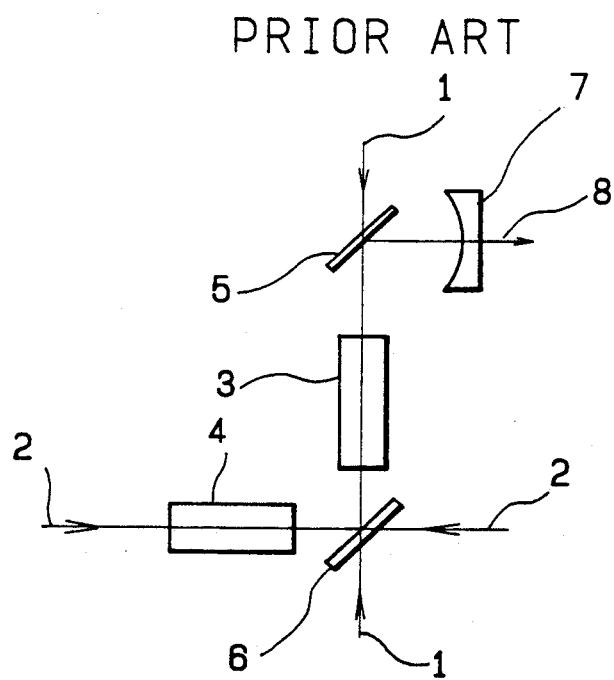
FIG. 10 shows a conventional laser resonator.
Figure 11:
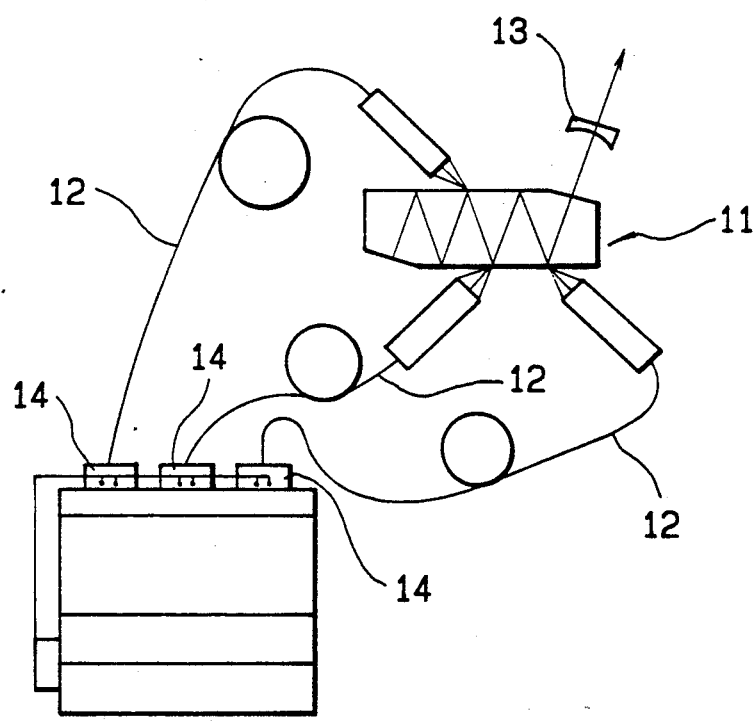
FIG. 11 shows a conventional laser resonator.

Referring to FIG. 9, in the ninth embodiment of the solid state laser embodiment, an optical modulation element 360 is arranged in place of at least one of the laser medium pieces. Thus the solid state laser has the optical modulation element 360 and the four laser medium pieces 307 to 310. Almost all of the optical modulation elements 360 have the same crystal orientation as the laser medium pieces. The optical modulation element is, for example, KTP, BBO (SHG element or Q switch).

The present invention is not limited to the above mentioned embodiments. In the seventh to ninth embodiments, it is conceivable that, at least one of the lower medium pieces 307 to 311 may be removed between the mirror 305 and the mirror 306. A non-linear material, such as a SHG crystal or Q switch, or other material, may be arranged between the mirrors 305, 306, for example. The SHG crystal is an axial crystal which makes a half of a fundamental wave length by a non-linear action.

It is easy to obtain a high-quality laser output light having a high output power when utilizing a material having no crystal orientation as a laser medium or laser base material. The solid state laser, such as a solid state laser resonator, can be compact in size by imparting a plurality of the laser lights along the zigzag optical path. Also, it is easy to excite the laser light by a plurality of the small-sized laser medium members so as to obtain the high-power output laser light. The solid state laser according to the present invention may be suited for use in a light source of a photocoagulator for optical ophthalmic surgery or a light source of a laser light machine.

In the solid state laser according to the present invention, each of the laser lights can be imparted along the zigzag optical path in the laser medium members between the mirrors. Thus, the solid state laser can be compact in size. As the optical axis of the solid state laser coincides with the crystal orientation of the laser oscillation, the laser oscillation can be performed in a highly efficient manner. A plurality of the laser lights are imparted from the outside of the mirrors so as to obtain a high quality laser light having a high power.

The solid state lasers as mentioned above are particularly useful for a laser light source for a photocoagulator for ophthalmic surgery or a laser light machine.

I claim:

1. A solid state laser comprising:
   (a) a plurality of laser generating means (40, 41, 42, 43, 44, 45) for generating laser lights (L2);
   (b) a plurality of laser medium means (21, 105, 106) arranged relative to a plurality of the laser generating means (40, 41, 42, 43, 44, 45);
   (c) the laser medium means (21, 105, 106) arranged for defining a zigzag reflected optical path (LP) in such a manner that the laser light (L2) or the laser lights (L2) from the laser generating means (40, 41, 42) are directed in a first direction along the zigzag reflected optical path (LP) and the laser light (L2) from the rest of the laser generating means (43, 44, 45) are directed in a second direction opposed to the first direction along the zigzag reflected optical path (LP) when imparting the laser lights (L2) to the laser medium means (21, 105, 106) along the zigzag reflected optical path (LP);
   (d) the laser medium means (21, 105, 106) being arranged for directing the laser light (L2) reflected by one of the laser medium means (21, 105, 106) to one of the rest of the laser medium means (21, 105, 106); and
   (e) an optical means (60, 61) for performing oscillating and exiting operations of a laser light (L1) produced along the zigzag reflected optical path (LP) when imparting the laser lights (L2) to the laser medium means (21, 105, 10) along the zigzag reflected optical path (LP), thereby producing a high power output light (L3).

2. The solid state laser of claim 1 wherein each of the laser medium means (21, 105, 106) is provided with a means (22, 23) so as to reflect the laser light (L1) along the zigzag reflected optical path (LP) in a highly efficient manner and to transmit the laser light (L2) in a high transmittance.

3. The solid state laser of claim 1 or 2, further comprising a support means (20) as an intermediate laser medium for supporting the laser medium means (21) on opposite sides thereof, the support means (20) being made of an isotropic optical glass.

4. The solid state laser of claim 1 wherein the laser medium means (21, 105, 106) are formed in a pellet or formed in a plate.

5. The solid state laser of claim 1 wherein the laser medium means consists of first and second laser medium members (105, 106), and wherein the first laser medium member (105) is spaced or separated from the second laser medium member (106).

6. The solid state laser of claim 1 wherein the laser medium means (21) are arranged in a staggered manner on the opposite sides of the support means (20) so as to provide the zigzag reflected optical path (LP).

7. The solid state laser of claim 1 wherein the laser generating means (40, 41, 42, 43, 44, 45) are arranged in such a manner that the laser lights (L2) from a plurality of the laser generating means (40, 41, 42, 43, 44, 45) are imparted to the corresponding laser medium means (21, 105, 106), thereby superimposing the laser lights (L2) along the zigzag reflected optical path (LP).

8. A solid state laser comprising:
(a) a laser generating means (320, 321, 322, 323, 324, 3254) for generating a laser light (L2);
(b) a first and second members (305, 306, 405, 406) arranged corresponding to the laser generating means (320, 321, 322, 323, 325);
(c) a plurality of laser medium means (307, 308, 309, 310, 311, 407, 408, 410, 411) arranged between the first and second members (305, 306, 405, 406) for defining a zigzag reflected optical path (LP) together with the first and second mirrors when imparting the laser light (L2) or the laser lights (L2) through the mirrors (305, 306, 405, 406) to the laser medium means (307, 309, 310, 311, 407, 409, 410) along the zigzag reflected optical path (LP);
(d) each of the laser medium means (307, 308, 309, 310, 311, 407, 408, 410, 411) made of a crystal having a crystal axis, each of the laser medium means (307, 308, 309, 310, 311, 407, 408, 410, 41) being arranged in such a manner that the crystal axis coincides with the zigzag reflected optical path (LP); and
(e) an optical means (60, 61) for performing oscillating and exciting operations of a laser light (L1) produced along the zigzag reflected optical path (LP) when imparting the laser light (L2) or the laser lights (L2) through at least one of the first and second members (305, 306, 405, 406) to the laser medium means (307, 308, 309, 310, 311), thereby producing a high power output laser light (L3).

9. The solid state laser of claim 8 wherein each of the first and second members (305, 306, 405, 406) is provided with a means to reflect the laser light (L1) along the zigzag reflected optical path (LP) in a highly efficient manner and to transmit the laser light (L2) in a high transmittance.

10. The solid state laser of claim 9 wherein the means are formed on the outside of the first member (305), and wherein the means are formed on the outside of the second member (306).

11. The solid state laser of claim 9 wherein the means are formed on the inside of the first member (405), and wherein the means are formed on the inside of the second member (406).

12. The solid state laser of claim 11 wherein the laser medium means (407, 408, 409, 410, 411) are spaced from the first and second members (405, 406).

13. The solid state laser of claim 9 wherein the laser medium means (307, 308, 309, 310, 311) contact the first and second members (305, 306).

14. The solid state laser of claim 8 wherein the laser medium means (307, 308, 309, 310, 311, 407, 408, 409, 410, 411) are formed in a rod shape and made of an uniaxial crystal or a biaxial crystal.

15. The solid state laser of claim 8 wherein each of the laser medium means (307, 308, 309, 310, 311, 407, 408, 409, 410, 411) has both ends for imparting the laser light (L2), and wherein the laser light (L1) is imparted to each of the both ends along the zigzag reflected optical path (LP) at a desired angle of incidence.

16. The solid state laser of claim 8, further comprising an optical modulation element is arranged between the first and second members.

* * * * *